United States Patent
Someya et al.

(10) Patent No.: US 7,426,212 B2
(45) Date of Patent: Sep. 16, 2008

(54) CONNECTION CONTROL DEVICE, METHOD AND PROGRAM

(75) Inventors: Harushi Someya, Kawasaki (JP); Yasunori Kaneda, Sagamihara (JP); Toru Nojiri, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 1149 days.

(21) Appl. No.: 10/233,513

(22) Filed: Sep. 4, 2002

(65) Prior Publication Data

US 2004/0008702 A1  Jan. 15, 2004

(30) Foreign Application Priority Data

Jul. 9, 2002 (JP) ............... 2002-199387

(51) Int. Cl.
*H04L 12/28* (2006.01)
(52) U.S. Cl. ............... 370/401; 370/466; 370/395.3
(58) Field of Classification Search ......... 370/401, 370/235, 395.3, 466
See application file for complete search history.

(56) References Cited

U.S. PATENT DOCUMENTS

| | | | | |
|---|---|---|---|---|
| 6,683,883 | B1 * | 1/2004 | Czeiger et al. | 370/401 |
| 7,103,653 | B2 * | 9/2006 | Iwatani | 709/223 |
| 7,106,751 | B2 * | 9/2006 | Miyamoto et al. | 370/401 |
| 2002/0010790 | A1 | 1/2002 | Ellis et al. | |
| 2002/0156612 | A1 * | 10/2002 | Schulter et al. | 703/23 |
| 2003/0126283 | A1 * | 7/2003 | Prakash et al. | 709/238 |
| 2003/0212781 | A1 | 11/2003 | Kaneda et al. | |

FOREIGN PATENT DOCUMENTS

JP  2003-324437  * 11/2003  ............... 709/223

OTHER PUBLICATIONS

"Cisco Introduces the Cisco SN 5428 Storage Router", Online! XP002246764 Retrieved from the Internet, Jul. 7, 2003.
Configuring SCSI Routing, Chapter 5, Cisco SN 5428 Storage Router Software Configuration Guide, pp. 5-1 to 5-14.

* cited by examiner

*Primary Examiner*—Ricky Ngo
*Assistant Examiner*—DeWanda Samuel
(74) *Attorney, Agent, or Firm*—Mattingly, Stanger, Malur & Brundidge, P.C.

(57) ABSTRACT

According to prior art techniques, it is not possible to set virtual groups of network devices between SANs and IP networks and to provide virtual connection control of network devices between SANs and IP networks. A network system having an IP network for interconnecting network devices constituting SANs, is provided with a virtual group conversion device for converting, when information including an identifier for identifying a virtual group in the IP network is received, the received identifier into an identifier for identifying a virtual group in the SANs and transmitting the converted identifier to a SAN virtual group setting device, and for converting, when information including an identifier for identifying a virtual group in the SANs is received, the received identifier into an identifier for identifying a virtual group in the IP network and transmitting the converted identifier to an IP virtual group setting device.

10 Claims, 8 Drawing Sheets

CONNECTION CONTROL DEVICE, METHOD AND PROGRAM

BACKGROUND OF THE INVENTION

The present invention relates to zoning SANs (Storage Area Networks), and more particularly to a zoning method and device for a plurality of SANs.

A switch constituting a SAN has a zoning function for grouping fibre channel ports (FC ports) of servers and FC ports of storage devices in units of a virtual group called zones in order to limit access between different zones. With this zoning function, it is possible to inhibit an access from one zone to another or vice versa. For example, it is also possible to inhibit an access to a storage device from some group in order to keep data security, or to determine a storage accessible by each OS (Operating System) in order to prevent any damages of a file system. Zoning is performed by using an identifier for each group unit (hereinafter called a zone name) or a WWN (World Wide Name). For Internet Protocol (IP) networks, VLAN (Virtual Local Area Network) techniques, which can set virtual terminal groups independently from physical connection topologies, are known.

There are other known techniques of interconnecting between SANs, distributed at a plurality of sites, by IP networks by converting in one-to-one correspondence between a WWN and a zone name which are identifiers of a network device in a fibre channel environment into a MAC (Media Access Control) and an IP address which are identifiers of a network device in an IP network environment.

According to the above-described prior art techniques, in a network of SANs interconnected by IP networks, virtual groups are set independently on SANs and IP networks. Therefore, it is not possible to set virtual groups of network devices between SANs and IP networks and to provide virtual connection control of network devices between SANs and IP networks.

The above-described prior art techniques do not provide the means for making an IP network inherit the zone information (zone name and WWN) representative of a virtual group. A reception side SAN cannot know the zone having a zone name (or the port having a WWN) to which the information is passed in order to perform proper zoning. Therefore, unless the IP network is uniquely configured for each zoning, the number of ports of a switch is limited so that the number of virtual groups capable of being set among SANs is limited.

SUMMARY OF THE INVENTION

An object of the invention is to enable to set virtual groups in a network of SANs interconnected by IP networks.

According to an embodiment of the invention, a network system having an IP network for interconnecting network devices constituting SANs is provided with a SAN virtual group setting device for limiting communications between network devices connected to the SANs in accordance with an identifier for identifying a virtual group in the SANs and an IP virtual group setting device for limiting communications between network devices connected to the IP network in accordance with an identifier for identifying a virtual group in the IP network. The network system is also provided with a virtual group conversion device for converting the received identifier into an identifier for identifying a virtual group in the SANs and transmitting the converted identifier to the SAN virtual group setting device when information including an identifier for identifying a virtual group in the IP network is received, and for converting the received identifier into an identifier for identifying a virtual group in the IP network and transmitting the converted identifier to the IP virtual group setting device when information including an identifier for identifying a virtual group in the SANs is received.

In the network system of the embodiment, it is preferable that the virtual group conversion device converts a virtual group identifier by referring to a conversion table storing one-to-one correspondence between the identifier for identifying a virtual group in the SANs and an identifier for identifying a virtual group in the IP network.

In the network system of the embodiment, it is preferable that the identifier for identifying a virtual group in the SANs is managed by each WWN.

In the network system of the embodiment, it is preferable that the identifier for identifying a virtual group in the IP network is a tag name which is an identifier in a VLAN.

According to another embodiment of the invention, a network system having an IP network for interconnecting SANs is provided with a SAN virtual group setting device for limiting communications between network devices connected to the SANs in accordance with an identifier for identifying a virtual group in the SANs and an IP virtual group setting device for limiting communications between network devices connected to the IP network in accordance with an identifier for identifying a virtual group in the IP network, wherein a plurality of virtual groups can be set in the SANs and the IP network.

Other objects, features and advantages of the invention will become apparent from the following description of the embodiments of the invention taken in conjunction with the accompanying drawings.

DESCRIPTION OF THE EMBODIMENTS

Figure 1:
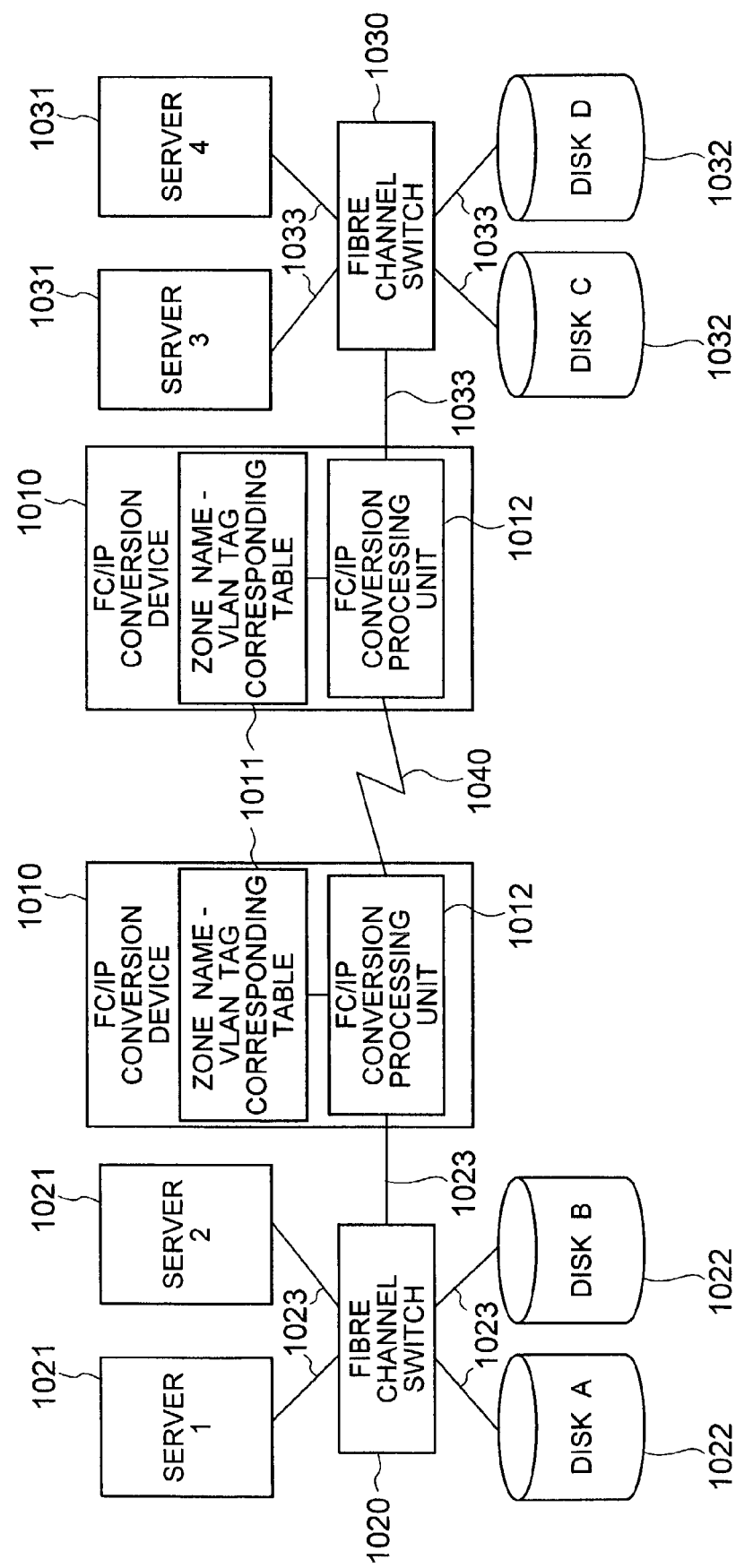
FIG. 1 is a diagram showing the configuration of a network system according to a first embodiment of the invention.

FIG. 1 is a diagram showing the overall configuration of a network system according to a first embodiment of the invention. An IP network 1040 interconnects two SAN environments via FC/IP conversion devices 1010. One SAN environment is constituted of a server group 1021 and a disk group 1022 connected to a fibre channel switch 1020 via fibre channel cables 1023, and the other SAN environment is constituted of a server group 1031 and a disk group 1032 connected to a fibre channel switch 1030 via fibre channel cables 1033.

The fibre channel switches 1020 and 1030 perform SAN zoning management to manage each group by a zone name which is an identifier of the group.

The FC/IP conversion devices 1010 perform protocol conversion between the IP network 1040 and fibre channel interfaces of the fibre cables 1023 and 1033. The device 1010 is constituted of a zone name—VLAN tag correspondence table 1011 and an FC/IP conversion processor 1012 for performing protocol conversion by referring to the table 1011. The table 1011 stores a correspondence between zoning information and VLAN tag information of the IP network. The structure of the zone name—VLAN tag correspondence table 1011 will be later described with reference to FIG. 2. The process to be executed by the FC/IP conversion processor 1040 will be later described with reference to FIG. 3.

A program for realizing the function of the FC/IP processor is assumed to be recorded in a storage medium such as a CD-ROM, stored in a magnetic disk or the like, and loaded in a memory to be executed. The medium for recording the program may be other storage media different from CD-ROM. The program may be installed from the storage medium into the FC/IP conversion processor or may be used by accessing the storage medium via a network.

Figure 2:
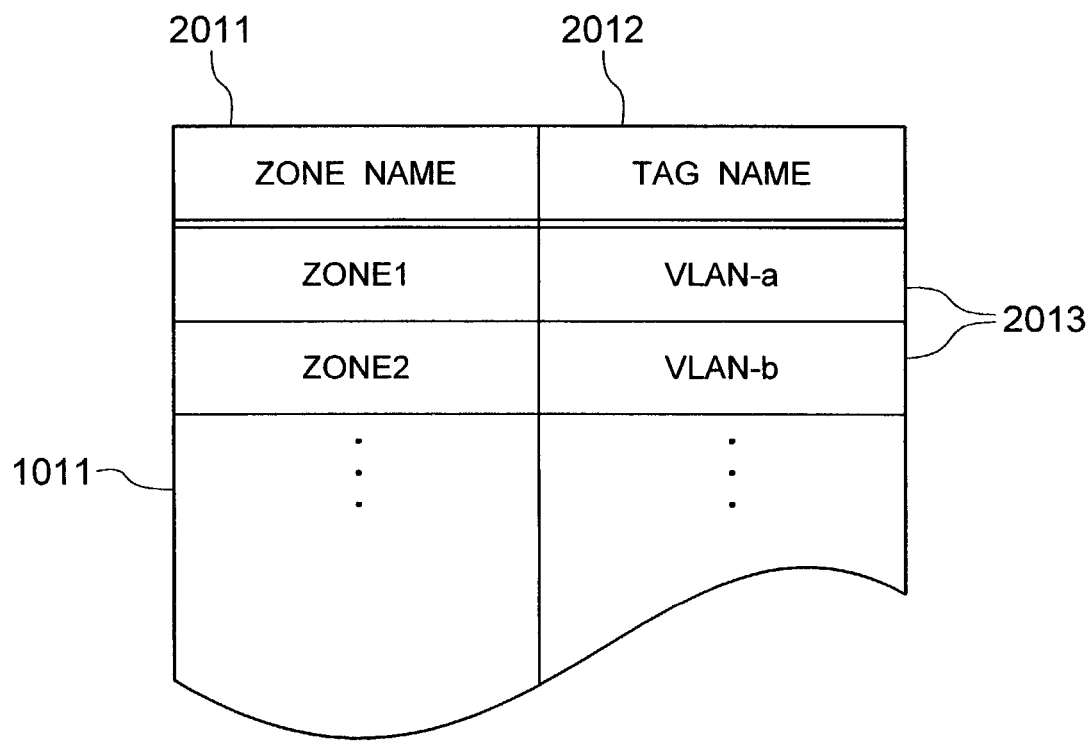
FIG. 2 is a correspondence table between a zone name and a VLAN tag name according to the first embodiment of the invention.

FIG. 2 shows the structure of the zone name—VLAN tag correspondence table 1011. This table 1011 is constituted of a plurality of records 2013. Each record 2013 has two storage areas, a zone name 2011 and a tag name 2012. Zone information to be set and managed by the fibre channel switches 1020 and 1030 is stored in the zone name 2011 area. In this example, the zone name as an identifier given to each group is stored. Tag information of VLAN corresponding to the zone information stored in the zone name 2011 area is stored in the tag name 2012 area. The zone name and tag name are stored in advance in one-to-one correspondence. The FC/IP conversion processor 1012 converts the zone information stored in the zone name 2011 area into the VLAN tag information stored in the tag name 2012 area or vice versa.

Figure 3:
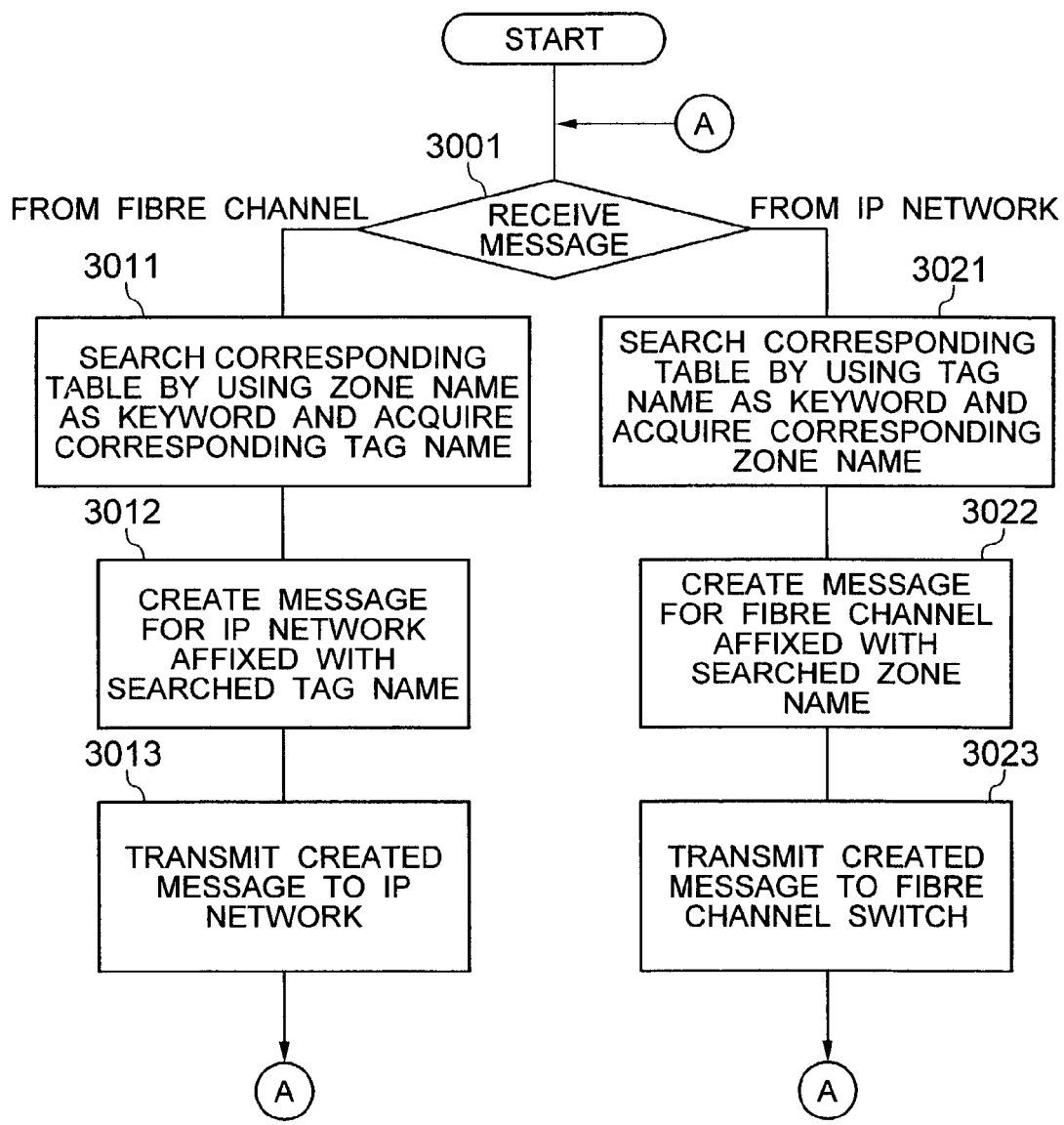
FIG. 3 is a flow chart illustrating a process to be executed by an FC/IP conversion processor according to the first embodiment of the invention.

FIG. 3 is a flow chart illustrating the process to be executed by the FC/IP conversion processor 1012. First, at Step 3001 the FC/IP conversion device receives a message. The message is received either from the fibre channel 1020, 1030 via the fibre channel cable 1023, 1033 or from the IP network 1040. In the former case, Steps 3011, 3012 and 3013 are executed to thereafter return to Step 3001, whereas in the latter case, Steps 3021, 3022 and 3023 are executed to thereafter return to Step 3001. Each Step to be executed when the message is received from the fibre channel cable 1023, 1033 will be described. At Step 3011 by using the zone information in the message as a keyword, the zone name—VLAN tag correspondence table 1011 is searched to acquire the VLAN tag information from the tag name 2012 area of the record 2013 in which the zone information is stored. At Step 3012 a message for the IP network 1040 affixed with the searched VLAN tag information is created. At Step 3013 the created message is transmitted to the IP network 1040. Next, each Step to be executed when the message is received from the IP network 1040 will be described. At Step 3021 by using the VLAN tag information in the message as a keyword, the zone name—VLAN tag correspondence table 1011 is searched to acquire the zone information from the zone name 2011 area of the record 2013 in which the VLAN tag information is stored. At Step 3022 a message for the fibre channel affixed with the searched zone information is created. At Step 3023 the created message is transmitted to the fibre channel switch 1020, 1030.

According to the embodiment, since the zone and VLAN tag information of SANs are unanimously related to each other, one IP network can set a plurality of zones in a plurality of SANs.

Figure 4:
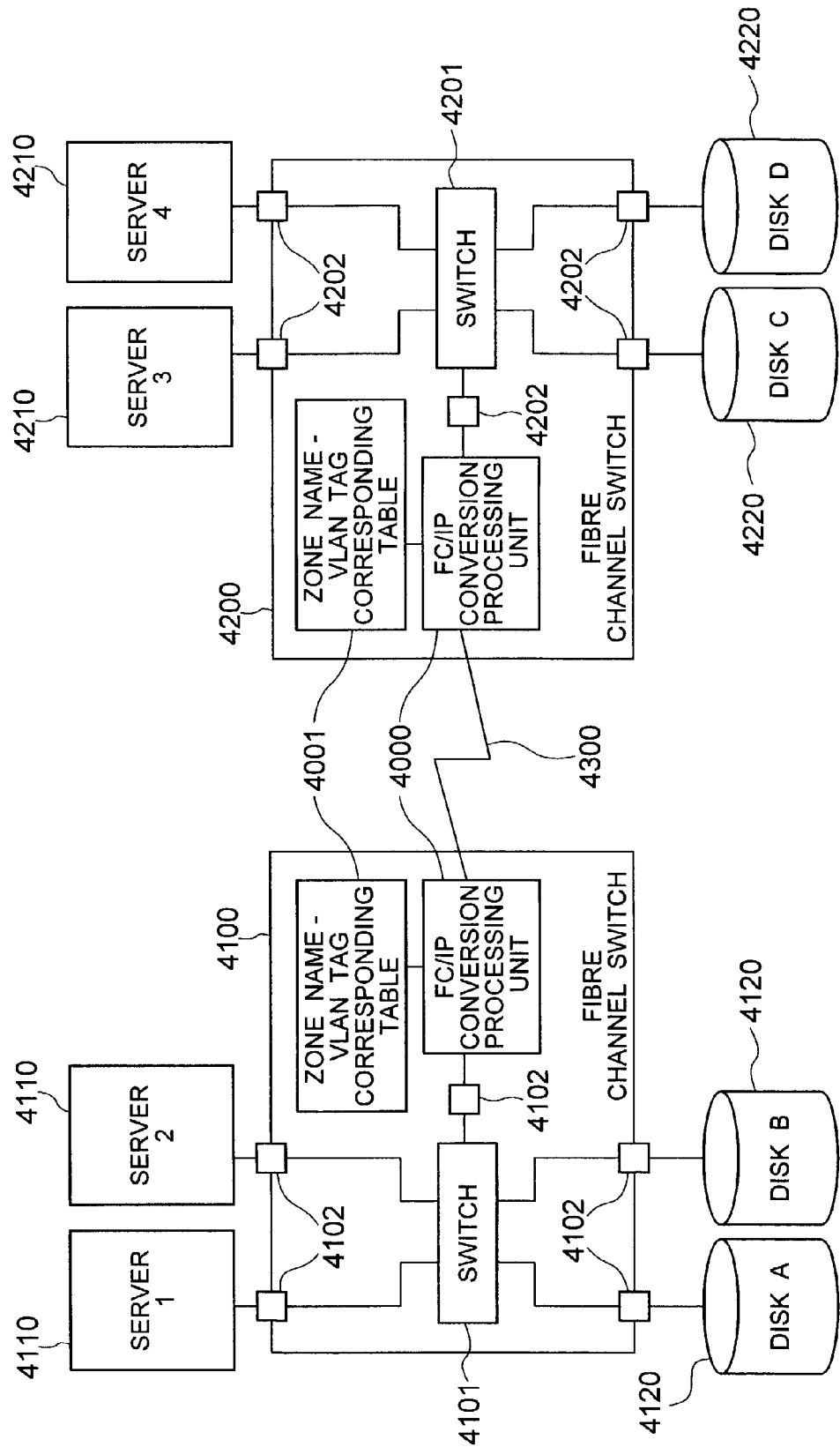
FIG. 4 is a diagram showing the configuration of a network system according to a second embodiment of the invention.

FIG. 4 is a diagram showing the overall configuration of a network system according to a second embodiment of the invention. In this configuration, the FC/IP conversion processor shown in FIG. 1 is built in the fibre channel switch 4100, 4200 which controls the connection between network devices constituting SAN. The fibre channel switch 4102, 4202 is constituted of a switch 4101, 4201, ports 4102, 4202 connected to the switch via fibre cables, an FC/IP conversion processor 4000 connected to the port 4102, 4202 via a fibre cable, and a zone name-VLAN tag correspondence table 4001. An IP network 4300 interconnects two SAN environments. One SAN environment is constituted of a server group 4110 and a disk group 4120 connected to respective ports of the fibre channel switch 4100, and the other SAN environment is constituted of a server group 4210 and a disk group 4220 connected to respective ports 4202 of the fibre channel switch 4200. The switch 4101, 4201 performs SAN zoning management. The structure of the zone name—VLAN tag correspondence table 4001 is the same as that shown in FIG. 2 of the zone name—VLAN tag correspondence table 1011 shown in FIG. 1. The flow chart illustrating the process to be executed by the FC/IP conversion processor is the same as that shown in FIG. 3 to be executed by the FC/IP conversion processor 1012 shown in FIG. 1.

Similar to the first embodiment, in the second embodiment one IP network can set a plurality of zones in a plurality of SANs. Since the FC/IP processor 4000 and zone name—VLAN tag correspondence table 4001 are built in the fibre channel switch 4100, 4200, the effects of the invention can be realized only by the fibre channel switch 4100, 4200.

In the first and second embodiments, zoning management is preformed by using a zone name which is an identifier of each group. In the third embodiment, zoning management is performed by using a WWN.

Figure 5:
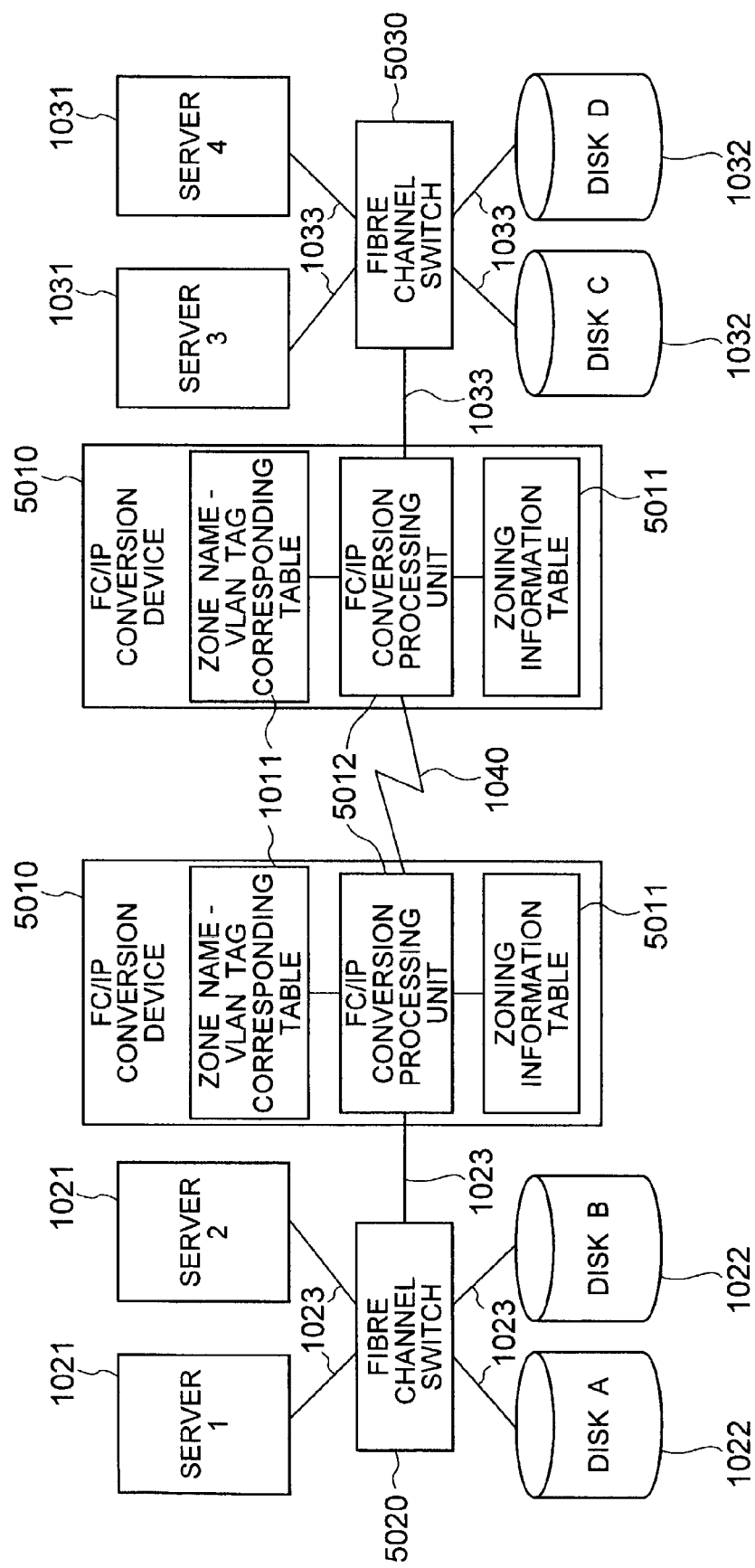
FIG. 5 is a diagram showing the configuration of a network system according to a third embodiment of the invention.

FIG. 5 is a diagram showing the overall configuration of a network system according to the third embodiment. This third embodiment is approximately similar to the first embodiment shown in FIG. 1. Mainly, different points from the first embodiment will be described. As different from the first embodiment, a fiber channel switch 5020, 5030 performs zoning management by using a WWN. FC/IP conversion devices 5010 perform protocol conversion between the IP network 1040 and fibre channel interfaces of fibre cables 1023 and 1033. The device 5010 is constituted of a zone name—VLAN tag correspondence table 1011, a zoning information table 5012 for storing zoning information including a WWN and a zone or group name, and an FC/IP conversion processor 5011 for performing protocol conversion by referring to the two tables 1011 and 5011. The structure of the zone name—VLAN tag correspondence table 1011 is similar to that shown in FIG. 2. The structure of the zoning information table 5011 will be later described with reference to FIG. 6. The process to be executed by the FC/IP conversion processor will be later described with reference to FIG. 7.

Figure 6:
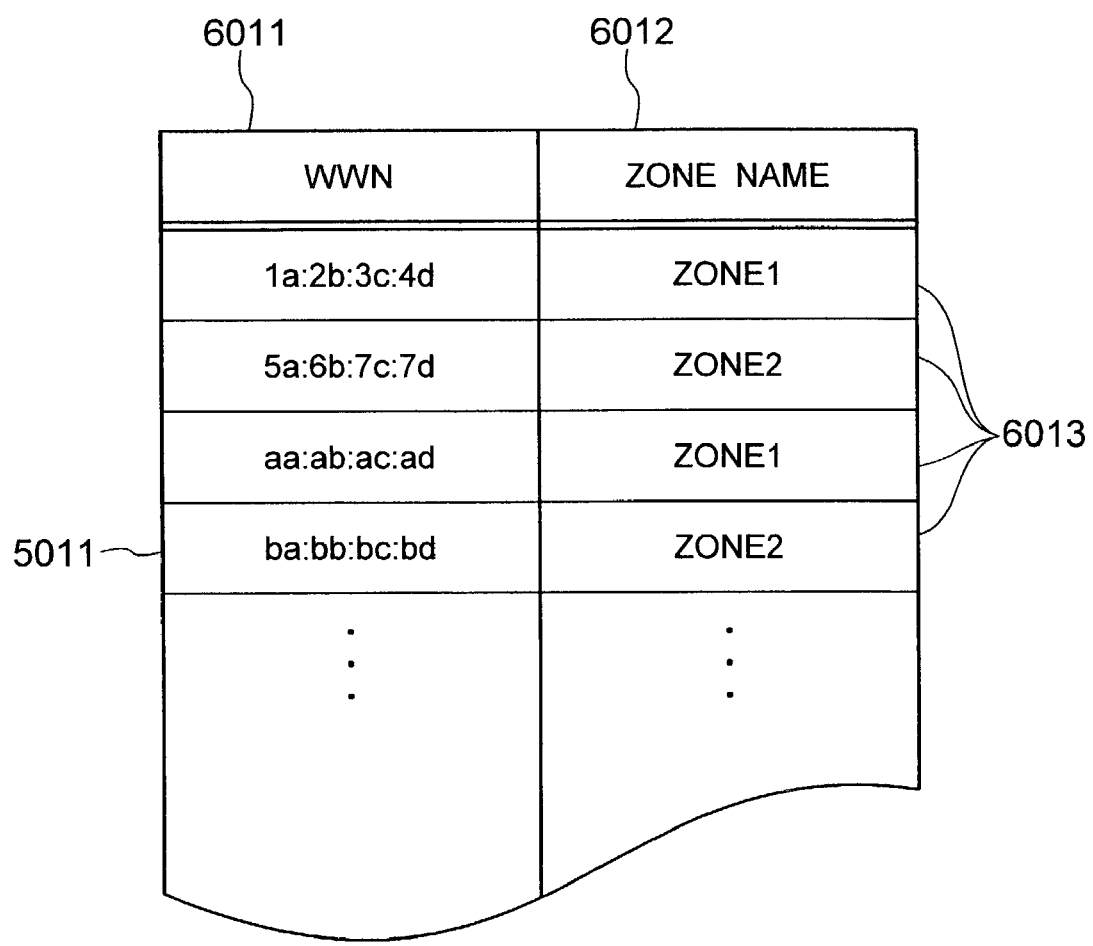
FIG. 6 shows the structure of a zoning information table according to the third embodiment of the invention.

FIG. 6 shows the structure of the zoning information table 5011. This table 5011 is constituted of a plurality of records 6013. Each record 6013 has two data storage areas, a WWN 6011 and a zone name 6012. each WWN to be set and managed by each fibre channel switch 5020, 5030 is stored in the WWN 6011 area. A zone name which is identification information given to each zone corresponding to WWN zoning is stored in the zone name 6012 area. Each zoning is assigned a different zone name and set in advance.

Figure 7:
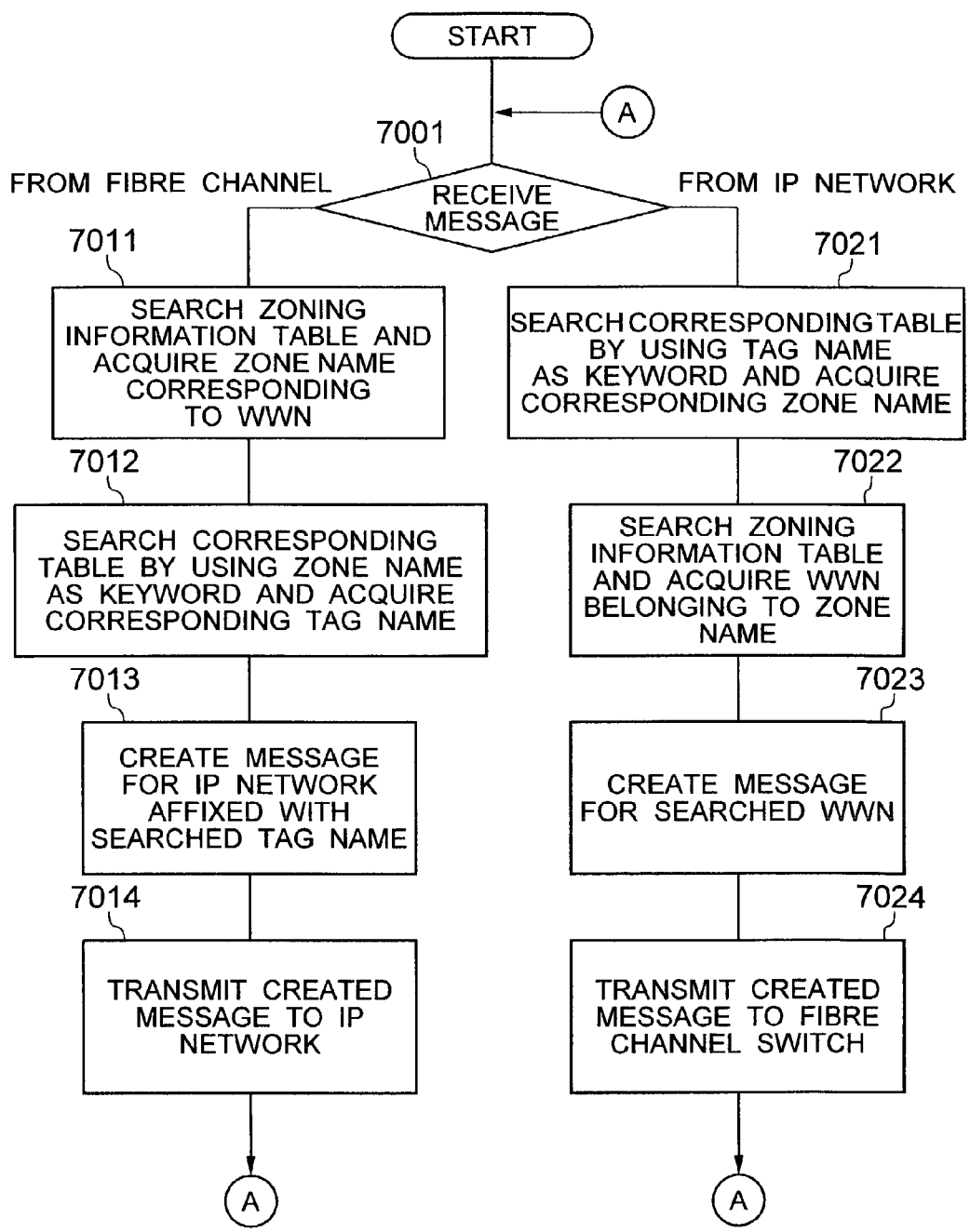
FIG. 7 is a flow chart illustrating a process to be executed by an FC/IP conversion processing unit according to the third embodiment of the invention.

FIG. 7 is a flow chart illustrating the process to be executed by the FC/IP conversion processor 5012. First, at Step 7001 the FC/IP conversion device receives a message. The message is received either from the fibre channel 5020, 5030 via the fibre channel cable 1023, 1033 or from the IP network 1040. In the former case, Steps 7011, 7012, 7013 and 7014 are executed to thereafter return to Step 7001, whereas in the latter case, Steps 7021, 7022, 7023 and 7024 are executed to thereafter return to Step 7001. Each Step to be executed when the message is received from the fibre channel cable 1023, 1033 will be described. At Step 7011 by using a WWN in the message as a keyword, the zoning information table 5011 is searched to acquire the zone name from the zone name 6012 area of the record 6013 in which the WWN is stored. At Step 7012 by using the searched zone name as a keyword, the zone name-VLAN tag correspondence table 1011 is searched to acquire VLAN tag information from the tag name 2012 area of the record 2013 in which the zone name is stored. At Step 7013 a message for the IP network 1040 affixed with the searched VLAN tag information is created. At Step 7014 the created message is transmitted to the IP network 1040. Each Step to be executed when the message is received from the IP network 1040 will be described. At Step 7021 by using the VLAN tag information in the message as a keyword, the zone name—VLAN tag correspondence table 1011 is searched to acquire the zone name from the zone name 2012 area of the record 2013 in which the VLAN tag information is stored. At Step 7022 by using the searched zone name as a keyword, the zoning information table 5011 is searched to acquire a WWN from the WWN 6011 area of the record 6013 in which the zone name is stored. At Step 7023 a message for the searched WWN is created. At Step 7024 the created message is transmitted to the fibre channel switch 5020, 5030.

According to the third embodiment, also in zoning management by WWN, since the zone and VLAN tag information of a plurality of SANs are unanimously related to each other, one IP network can set a plurality of zones in a plurality of SANs.

Figure 8:
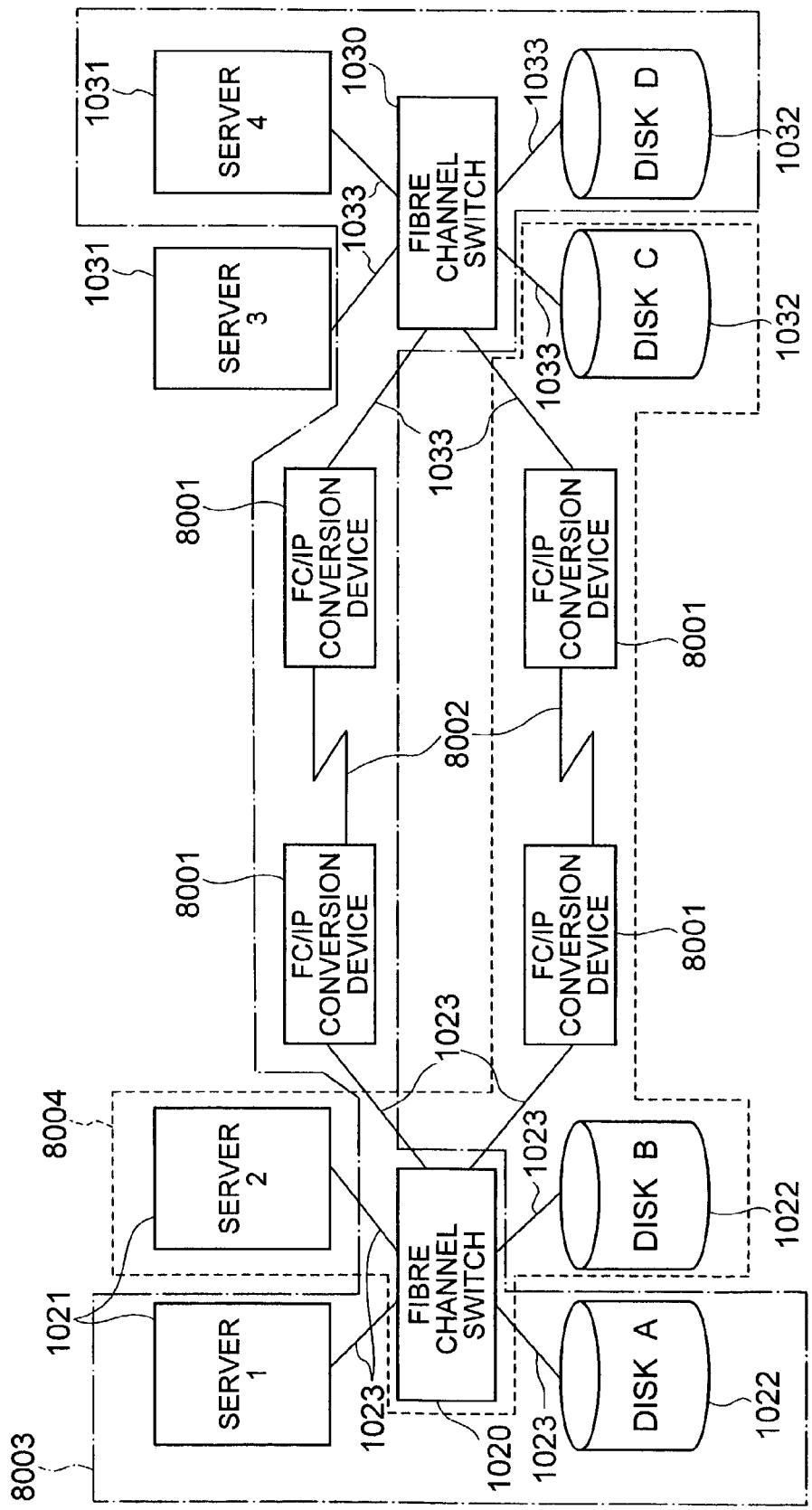
FIG. 8 is a diagram showing the configuration of a network system according to a fourth second embodiment of the invention.

FIG. 8 is a diagram showing the overall configuration of a network system according to a fourth embodiment of the invention. This fourth embodiment is approximately similar to the first embodiment shown in FIG. 1. Mainly, different points from the first embodiment will be described. In the fourth embodiment, two SAN systems are interconnected by an IP network 8002 via FC/IP conversion devices 8001 not having a zone name—VLAN tag conversion function. The FC/IP conversion device 8001 converts in one-to-one correspondence a WWN and a zone name which are identifiers of a network device in a fibre channel environment into a MAC (Media Access Control) and an IP address which are identifiers of a network device in an IP network environment. For zoning over a plurality of SAN environments, the FC/IP conversion devices 8001 are connected to fibre channels 1020 and 1030 and the FC/IP conversion devices 8001 are interconnected by the IP network to thereby define the same zone to which some of the devices connected to the fibre channel switches 1020 and 1030 belong. Similar to the first to third embodiments, SAN zoning management is performed by the fibre channel switches 1020 and 1030 using either the zone name which is an identifier of a zone or the WWN which is an identifier of a network device. In the example shown in FIG. 8, zones 8003 and 8004 are defined. In this embodiment, FC/IP conversion devices 8001 are provided for each zone and SANs are interconnected by the IP network 8002, so that zoning for SANs is possible. In this embodiment, pairs of FC/IP conversion devices 8001 corresponding in number to the number of zones to be defined over SANs are interconnected by the IP network 8002. Therefore, depending upon the relation between the number of ports supported by the fibre channel switches 1020 and 1030 and the number of servers 1021 and 1031 and disks 1022 and 1033 to be connected, the number of zones capable of being defined over SANs is limited. This physical number is not limited in the first to third embodiments. In the first to third embodiments, if the IP network is configured uniquely, the number of virtual groups can be increased by increasing the number of switch ports.

According to the invention, virtual groups can be set for an IP-SAN network having a plurality of SANs interconnected by an IP network, while an implementation cost required for the IP network interconnecting SANs is reduced.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. A network system comprising:
a plurality of Storage Area Networks (SANs) interconnected by an Internet Protocol (IP) network, each of the SANs has at least a server and at least a storage device;
a SAN virtual group setting device for limiting communications between the server and the storage device in the SANs in accordance with an identifier for identifying a virtual group in the SANs;
an IP virtual group setting device for limiting communications between the virtual group in the SANs and a virtual group in the IP network in accordance with an identifier for identifying the virtual group in the IP network; and
a virtual group conversion device for, when information including the identifier for identifying the virtual group in the IP network is received from the IP network, converting the received identifier into the identifier for identifying the virtual group in the SANs and transmitting the converted identifier to the SAN virtual group setting device, and when information including the identifier for identifying the virtual group in the SANs is received from one of the SANs, converting the received identifier into the identifier for identifying the virtual group in the IP network and transmitting the converted identifier to the IP virtual group setting device.

2. A network system according to claim 1, wherein the virtual group conversion device converts a virtual group identifier in accordance with a conversion table indicating one-to-one correspondence relation between the identifier for identifying the virtual group in the SANs and the identifier for identifying the virtual group in the IP network.

3. A network system according to claim 1, wherein the identifier for identifying the virtual group in the SANs is managed by each World Wide Name (WWN).

4. A network system according to claim 1, wherein the identifier for identifying the virtual group in the IP network is a tag name which is an identifier in a Virtual Local Area Network (VLAN).

5. A connection control device for controlling interconnection conditions between a plurality of Storage Area Networks (SANs) interconnected by an Internet Protocol (IP) network, each of the SANs has at least a server and at least a storage device;
a SAN virtual group setting device for limiting communications between the server and the storage device in the SANs in accordance with an identifier for identifying a virtual group in the SANs; and a virtual group conversion device for, when information including an identifier for identifying a virtual group in the IP network is received from the IP network, converting the received identifier into an identifier for identifying a virtual group in the SANs and transmitting the converted identifier to the SAN virtual group setting device, and when information including an identifier for identifying the virtual group in the SANs is received from one of SANs, converting the received identifier into the identifier for identifying the virtual group in the IP network and transmitting the converted identifier to an IP virtual group setting device for limiting communications between to the virtual group in the SANs and the virtual group in the IP network in accordance with an identifier for identifying a virtual group in the IP network.

6. An information device for interconnecting an Internet Protocol (IP) network and a plurality of Storage Area Networks (SANs), each of which has at least a server and at least a storage device, comprising:

a first conversion unit, when information including an identifier for identifying a virtual group in the IP network is received from the IP network, converting the received identifier into an identifier for identifying a virtual group in the SANs;

a first transmission unit for transmitting the identifier converted by the first conversion unit to a Storage Area Network (SAN) virtual group setting unit for limiting communications between the server and the storage device in the SANs in accordance with an identifier for identifying a virtual group in the SANs;

a second conversion unit, when information including an identifier for identifying a virtual group in the SANs is received from one of SANs, converting the received identifier into the identifier for identifying the virtual group in the IP network; and a second transmission unit for transmitting the identifier converted by the second conversion unit to an IP virtual group setting unit for limiting communications between to the virtual group in the SANs and the virtual group in the IP network in accordance with the identifier for identifying the virtual group in the IP network.

7. A connection control method for an Internet Protocol (IP) network and a plurality of Storage Area Networks (SANs), each of the SANs has at least a server and at least a storage device, comprising:

a first step of converting, when information including an identifier for identifying a virtual group in the IP network is received from the IP network, the received identifier into an identifier for identifying a virtual group in the SANs;

a second step of transmitting the identifier converted by the first step to a Storage Area network (SAN) virtual group setting unit for limiting communications between the server and the storage device in the SANs in accordance with an identifier for identifying a virtual group in the SANs;

a third step of converting, when information including an identifier for identifying a virtual group in the SANs is received from one of the SANs, the received identifier transmitted by the second step into the identifier for identifying the virtual group in the IP network; and a fourth step of transmitting the identifier converted by the third step to an IP virtual group setting unit for limiting communications between to the virtual group in the SANs and the virtual group in the IP network in accordance with the identifier for identifying the virtual group in the IP network.

8. A computer readable storage medium having stored thereon a program for performing connection control between an Internet Protocol (IP) network and a plurality of Storage Area Networks (SANs), each of the SANs has at least a server and at least a storage device, said program upon execution by a computer causes said computer to perform:

a first step of converting, when information including an identifier for identifying a virtual group in the IP network is received from the IP network, the received identifier into an identifier for identifying a virtual group in the SANs;

a second step of transmitting the identifier converted by the first step to a Storage Area Network (SAN) virtual group setting unit for limiting communications between the server and the storage device in the SANs in accordance with an identifier for identifying a virtual group in the SANs;

a third step of converting, when information including an identifier for identifying a virtual group in the SANs is received from one of the SANs, the identifier transmitted by the second step into an identifier for identifying a virtual group in the IP network; and a fourth step of transmitting the identifier converted by the third step to an IP virtual group setting unit for limiting communications between to the virtual group in the SANs and the virtual group in the IP network in accordance with the identifier for identifying the virtual group in the IP network.

9. A computer readable storage medium having stored thereon a program including computer executable code for, upon execution of the computer executable code by a computer, making the computer perform a connection control between an Internet Protocol (IP) network and a plurality of Storage Area Networks (SANs), each of the SANs has at least a server and at least a storage device, the computer executable code of the program comprising:

a first code of converting, when information including an identifier for identifying a virtual group in the IP network is received from the IP network, the received identifier into an identifier for identifying a virtual group in the SANs;

a second code of transmitting the identifier converted by the first step to a SAN virtual group setting unit for limiting communications between the server and the storage device in the SANs in accordance with an identifier for identifying a virtual group in the SANs;

a third code of converting, when information including an identifier for identifying a virtual group in the SANs is received from one of SANs, the identifier transmitted as a result of execution of the second code into an identifier for identifying a virtual group in the IP network; and a fourth code of transmitting the identifier converted by the third code to an IP virtual group setting unit for limiting communications between to the virtual group in the SANs and the virtual group in the IP network in accordance with an identifier for identifying a virtual group in the IP network.

10. The network system according to claim 1, further comprising:

a switch for coupling the server and the storage device and including the SAN virtual group setting device; and a network device connected to the switch and the IP network and including the IP virtual group setting device.

* * * * *